(12) United States Patent
Xie

(10) Patent No.: US 10,435,109 B2
(45) Date of Patent: Oct. 8, 2019

(54) GASOLINE ENGINE BOOSTING SYSTEM AND BICYCLE USING THE SAME

(71) Applicant: Junhui Xie, Shanghai (CN)

(72) Inventor: Junhui Xie, Shanghai (CN)

(*) Notice: Subject to any disclaimer, the term of this patent is extended or adjusted under 35 U.S.C. 154(b) by 77 days.

(21) Appl. No.: 15/562,484

(22) PCT Filed: Mar. 28, 2017

(86) PCT No.: PCT/CN2017/078355
§ 371 (c)(1),
(2) Date: Sep. 28, 2017

(87) PCT Pub. No.: WO2017/177815
PCT Pub. Date: Oct. 19, 2017

(65) Prior Publication Data
US 2018/0194429 A1    Jul. 12, 2018

(30) Foreign Application Priority Data
Apr. 15, 2016    (CN) .................... 2016 2 0316941 U

(51) Int. Cl.
*B62M 6/30*    (2010.01)
*B62M 7/02*    (2006.01)
(Continued)

(52) U.S. Cl.
CPC ................ *B62M 6/30* (2013.01); *B62M 6/25* (2013.01); *B62M 7/02* (2013.01); *B62M 7/04* (2013.01); *B62M 23/02* (2013.01)

(58) Field of Classification Search
CPC . B62M 6/25; B62M 6/30; B62M 7/02; B62M 7/04; B62M 23/02; B62M 2701/0015
(Continued)

(56) References Cited

U.S. PATENT DOCUMENTS

| 699,284 A | * | 6/1902 | Caps | B62M 7/00 |
| | | | | 180/205.2 |
| 2,560,991 A | * | 7/1951 | Schuricht | A01B 71/06 |
| | | | | 180/205.2 |
| 8,443,924 B2 | * | 5/2013 | Pesenti | B62M 6/20 |
| | | | | 180/205.2 |

FOREIGN PATENT DOCUMENTS

| CN | 2208537 | 9/1995 |
| CN | 1184753 | 6/1998 |

(Continued)

OTHER PUBLICATIONS

International search report dated Jun. 27, 2017 from corresponding application No. PCT/CN2017/078355.

*Primary Examiner* — Joseph M Rocca
*Assistant Examiner* — Felicia L. Brittman
(74) *Attorney, Agent, or Firm* — Hauptman Ham, LLP

(57) ABSTRACT

A gasoline engine boosting system including a fuel tank, an engine, a fuel tube, an accelerator line, a drive sprocket, a drive chain, a discharge pipe and a fixing bracket. The fixing bracket includes an adjustable engine fixing bracket. The adjustable engine fixing bracket includes a first front fixing rod, a second front fixing rod, a first rear fixing rod, a second rear fixing rod, a front fixing base, a rear fixing base, a first tube clip and a second tube clip, the front fixing base and the rear fixing base are respectively fixed on a front side and a rear side of the engine. The front fixing base includes a front sliding adjustment groove. The rear fixing base includes a rear sliding adjustment groove allow. The gasoline engine boosting system is adaptable to a bicycle frame.

10 Claims, 3 Drawing Sheets

(51) Int. Cl.
*B62M 23/02* (2010.01)
*B62M 6/25* (2010.01)
*B62M 7/04* (2006.01)

(58) Field of Classification Search
USPC .................................................... 180/205.2
See application file for complete search history.

(56) References Cited

FOREIGN PATENT DOCUMENTS

| CN | 205801410 | 12/2016 |
|----|-----------|---------|
| CN | 206031685 | 3/2017 |
| DE | 10000061 | 7/2001 |
| EP | 0218493 | 4/1987 |
| KR | 20100070476 | 6/2010 |

* cited by examiner

GASOLINE ENGINE BOOSTING SYSTEM AND BICYCLE USING THE SAME

RELATED APPLICATIONS

The present application is a National Phase of International Application No. PCT/CN2017/078355, filed Mar. 8, 2017, and claims the priority of China Application No. 201620316941.0, filed Apr. 15, 2016.

FIELD OF THE UTILITY MODEL

The present utility model relates to a gasoline engine boosting bicycle.

BACKGROUND OF THE UTILITY MODEL

Bicycles, also known as bikes, are usually small land vehicles with two wheels. When used, the bicycle is powered by the pedals thereof, promoting green environmental protection. English word "bicycle" means two-wheel vehicle, wherein "bi" means "two", and "cycle" means "wheel". Bicycles are commonly called "zixingche" or "jiaotache" in mainland China, Taiwan and Singapore, "danche" in Hong Kong and Macao (mainly in Cantonese), and "self rotating vehicle" in Japan. There are many types of bicycles, such as separate bicycles, two-man bicycles and tandem bicycles. For easier riding, bicycles assembling an internal combustion engine appeared on the market. Driven by the internal combustion engine, such bicycles have features of low fuel consumption and fast driving speed, providing more convenience for people. However, the problem of such bicycles is that the gasoline engine boosting system is usually installed on the bicycle frame at the using stage, and the structure of bicycles varies from one manufacturer to another. Therefore, the installation and matching between the gasoline engine boosting system and the bicycle frame are difficult. Consequently, how to design a gasoline engine boosting system capable of being installed more simply and quickly on the frame of most bicycles becomes a technical problem to be solved by people skilled in the art.

BRIEF SUMMARY OF THE UTILITY MODEL

The purpose of the present utility model is to overcome the shortcomings of existing technologies Therefore, the present utility model provides a gasoline engine boosting bicycle that can be installed more simply and quickly on the frame of most bicycles and a gasoline engine boosting system and bicycle using the same.

The aims of the present utility model are implemented by the following technical schemes: a gasoline engine boosting system, comprising a fuel tank for storing fuel, an engine for supplying power, a fuel tube for delivering fuel to the engine, an accelerator line for controlling fuel supply of the engine, a drive sprocket for fixing to a rear wheel, a drive chain for connecting the drive sprocket and the engine, a discharge pipe for discharging exhaust gas, and a fixing bracket for installing the gasoline engine boosting system, wherein two ends of the fuel tube are respectively connected to the fuel tank and a carburetor disposed on the engine, the accelerator line is connected with the carburetor disposed on the engine, the driving sprocket and the engine are connected by the driving chain, and the discharge pipe is connected to the engine, characterized in that: the fixing bracket comprises an adjustable engine fixing bracket, the adjustable engine fixing bracket comprises a first front fixing rod, a second front fixing rod, a first rear fixing rod, a second rear fixing rod, a front fixing base, a rear fixing base, a first tube clip and a second tube clip, the front fixing base and the rear fixing base are respectively fixed on a front side and a rear side of the engine, wherein the front fixing base is provided with a front sliding adjustment groove allowing the first front fixing rod and the second front fixing rod to be slidable, the rear fixing base is provided with a rear sliding adjustment groove allowing the first rear fixing rod and the second rear fixing rod to be slidable, both ends of the front sliding adjustment groove or the rear sliding adjustment groove are connected to an outer space, enabling the first front fixing rod and the second front fixing rod to respectively extend from each of the ends of the front sliding adjustment groove, and enabling the first rear fixing rod and the second rear fixing rod to respectively extend from each of the ends of the rear sliding adjustment groove, one of the ends of the first front fixing rod and one of the ends of the first rear fixing rod are both hinged to the first tube clip enabling the first tube clip to be rotatable relative to the first front fixing rod and the first rear fixing rod, and one of the ends of the second front fixing rod and one of the ends of the second rear fixing rod are both hinged to the second tube clip.

Further, the first front fixing rod and the second front fixing rod are fixed to the front fixing base through a first screw, and the front fixing base is provided with a front screw hole communicating with the front sliding adjustment groove, the first screw is screwed into the front screw hole and is pressed against the first front fixing rod and the second front fixing rod causing the first front fixing rod and the second front fixing rod to remain fixed relative to the front fixing base, the first rear fixing rod and the second rear fixing rod are fixed to the rear fixing base through the first screw, the rear fixing base is provided with a rear screw hole communicating with the rear sliding adjustment groove, and the first screw is screwed into the rear screw hole and is pressed against the first rear fixing rod and the second rear fixing rod causing the first rear fixing rod and the second rear fixing rod to remain fixed relative to the rear fixing base.

Further, one or more front fixing screw bases protruding from a front end surface of the engine are fixed to the front end surface of the engine, each of the front fixing screw bases is provided with a front shell fixing screw hole for fixing a front shell, one or more rear fixing screw bases protruding from a rear end surface of the engine is fixed to the rear end surface of the engine, and each of the rear fixing screw bases is provided with a rear shell fixing screw hole for fixing a rear shell.

Further, the front end face of the engine is provided with four front fixing screw bases, and the rear end faces of the engine are provided with four rear fixing screw bases.

Further, the engine comprises a single cylinder two-stroke engine or a single cylinder four-stroke engine.

A gasoline engine boosting bicycle, comprising a bicycle frame, a front wheel, a rear wheel and a gasoline engine boosting system, the front wheel and the rear wheel are respectively rotatably mounted at both ends of the bicycle frame, characterized in that: the gasoline engine boosting system, comprising a fuel tank for storing fuel, an engine for supplying power, a fuel tube for delivering fuel to the engine, an accelerator line for controlling fuel supply of the engine, a drive sprocket for fixing to a rear wheel, a drive chain for connecting the drive sprocket and the engine, a discharge pipe for discharging exhaust gas, and a fixing bracket for installing the gasoline engine boosting system, wherein two ends of the fuel tube are respectively connected to the fuel tank and a carburetor disposed on the engine, the accelerator line is connected with the carburetor disposed on the engine, the driving sprocket and the engine are connected by the driving chain, and the discharge pipe is connected to the engine, characterized in that: the fixing bracket comprises an adjustable engine fixing bracket, the adjustable engine fixing bracket comprises a first front fixing rod, a second front fixing rod, a first rear fixing rod, a second rear fixing rod, a front fixing base, a rear fixing base, a first tube clip and a second tube clip, the front fixing base and the rear fixing base are respectively fixed on a front side and a rear side of the engine, wherein the front fixing base is provided with a front sliding adjustment groove allowing the first front fixing rod and the second front fixing rod to be slidable, the rear fixing base is provided with a rear sliding adjustment groove allowing the first rear fixing rod and the second rear fixing rod to be slidable, both ends of the front sliding adjustment groove or the rear sliding adjustment groove are connected to an outer space, enabling the first front fixing rod and the second front fixing rod to respectively extend from each of the ends of the front sliding adjustment groove, and enabling the first rear fixing rod and the second rear fixing rod to respectively extend from each of the ends of the rear sliding adjustment groove, one of the ends of the first front fixing rod and one of the ends of the first rear fixing rod are both hinged to the first tube clip enabling the first tube clip to be rotatable relative to the first front fixing rod and the first rear fixing rod, and one of the ends of the second front fixing rod and one of the ends of the second rear fixing rod are both hinged to the second tube clip.

Further, the first front fixing rod and the second front fixing rod are fixed to the front fixing base through a first screw, and the front fixing base is provided with a front screw hole communicating with the front sliding adjustment groove, the first screw is screwed into the front screw hole and is pressed against the first front fixing rod and the second front fixing rod causing the first front fixing rod and the second front fixing rod to remain fixed relative to the front fixing base, the first rear fixing rod and the second rear fixing rod are fixed to the rear fixing base through the first screw, the rear fixing base is provided with a rear screw hole communicating with the rear sliding adjustment groove, and the first screw is screwed into the rear screw hole and is pressed against the first rear fixing rod and the second rear fixing rod causing the first rear fixing rod and the second rear fixing rod to remain fixed relative to the rear fixing base.

Further, one or more front fixing screw bases protruding from a front end surface of the engine are fixed to the front end surface of the engine, each of the front fixing screw bases is provided with a front shell fixing screw hole for fixing a front shell, one or more rear fixing screw bases protruding from a rear end surface of the engine is fixed to the rear end surface of the engine, and each of the rear fixing screw bases is provided with a rear shell fixing screw hole for fixing a rear shell.

Further, the front end face of the engine is provided with four front fixing screw bases, and the rear end faces of the engine are provided with four rear fixing screw bases.

Further, the engine comprises a single cylinder two-stroke engine or a single cylinder four-stroke engine.

As compared with the existing art, the present utility model has the following advantages and beneficial effects: installation of the gasoline engine boosting system of the utility model is easy. The gasoline engine boosting system can be adapted to the bicycle frame with different sizes and models, has the features of convenient installation and compact structure, and has great market promotion prospect.

DETAILED DESCRIPTION OF THE PREFERRED EMBODIMENTS

The present utility model will now be described more specifically with reference to the following embodiments. It is to be noted that the following descriptions of preferred embodiments of this utility model are presented herein for purpose of illustration and description only. It is not intended to be exhaustive or to be limited to the precise form disclosed.

EMBODIMENT

Figure 1:
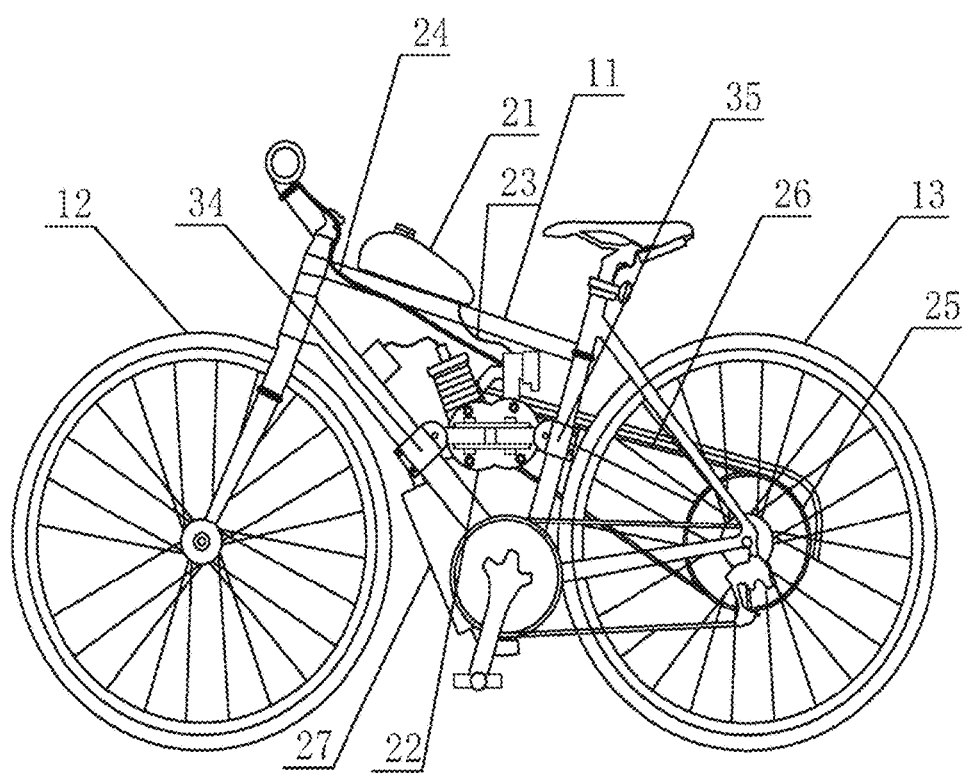
FIG. 1 is a schematic diagram of the structure of the gasoline engine boosting bicycle according to the embodiment of the present utility model.
Figure 2:
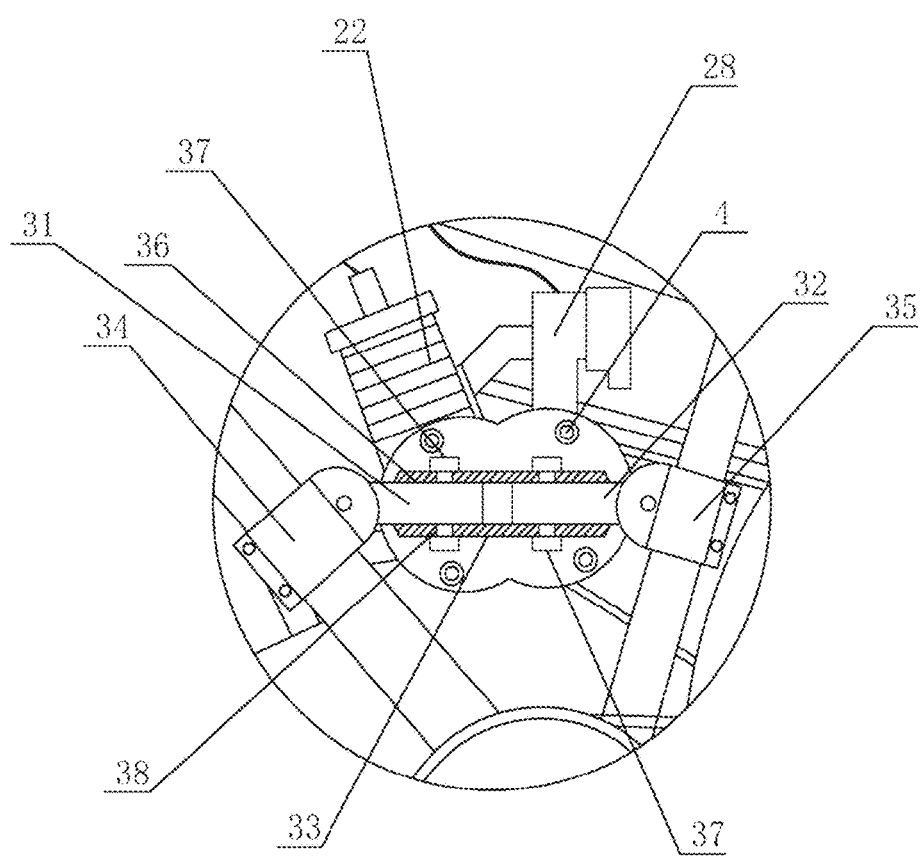
FIG. 2 is a schematic diagram of the installation structure for the gasoline engine from a first side according to the embodiment of the present utility model.
Figure 3:
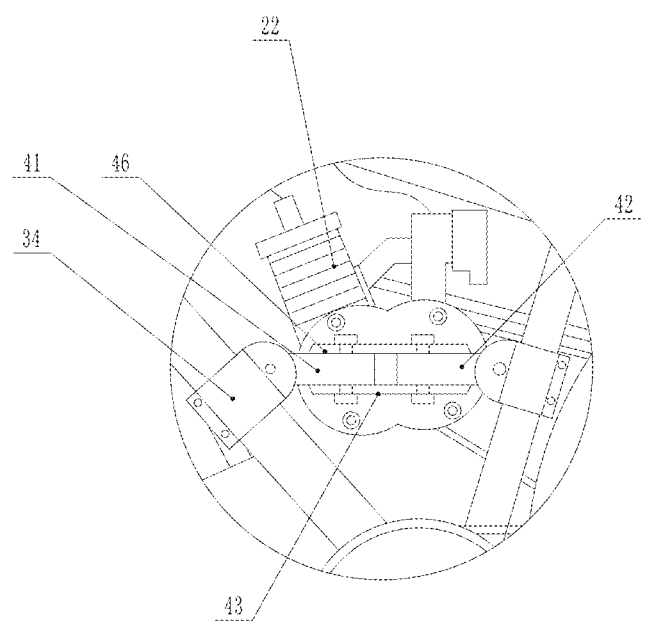
FIG. 3 is a schematic diagram of the installation structure for the gasoline engine from a second side, opposite the first side, according to the embodiment of the present utility model.

As shown in FIG. 1 to FIG. 3, a gasoline engine boosting bicycle according to the embodiment comprises a bicycle frame 11, a front wheel 12, a rear wheel 13 and a gasoline engine boosting system, the front wheel 12 and the rear wheel 13 are respectively rotatably mounted at both ends of the bicycle frame 11, the gasoline engine boosting system, comprising a fuel tank 21 for storing fuel, an engine 22 for supplying power, a fuel tube 23 for delivering fuel to the engine 22, an accelerator line 24 for controlling the engine 22 fuel supply, a drive sprocket 25 for fixing to the rear wheel 13, a drive chain 26 for connecting the drive sprocket 25 and the engine 22, a discharge pipe 27 for discharging exhaust gas, and a fixing bracket for installing the gasoline engine boosting system, wherein two ends of the fuel tube 23 are respectively connected to the fuel tank 21 and a carburetor 28 disposed on the engine 22, the accelerator line 24 is connected with the carburetor 28 disposed on the engine 22, the driving sprocket 25 and the engine 22 are connected by the driving chain 26, and the discharge pipe 27 is connected to the engine 22, wherein the fixing bracket comprises an adjustable engine 22 fixing bracket, the adjustable engine 22 fixing bracket comprises a first front fixing rod 31, a second front fixing rod 32, a first rear fixing rod 41, a second rear fixing rod 42, a front fixing base 33, a rear fixing base 43, a first tube clip 34 and a second tube clip 35, the front fixing base 33 and the rear fixing base 43 are respectively fixed on a front side and a rear sides of the engine 22, wherein the front fixing base 33 is provided with a front sliding adjustment groove 36 allowing the first front fixing rod 31 and the second front fixing rod 32 to be slidable, the rear fixing base 43 is provided with a rear sliding adjustment groove 46 allowing the first rear fixing rod 41 and the second rear fixing rod 42 to be slidable, both ends of the front sliding adjustment groove 36 or the rear sliding adjustment groove 46 are connected to an outer space, enabling the first front fixing rod 31 and the second front fixing rod 32 to respectively extend from each of the ends of the front sliding adjustment groove 36, and enabling the first rear fixing rod 41 and the second rear fixing rod 42 to respectively extend from each of the ends of the rear sliding adjustment groove 46, one of the ends of the first front fixing rod 31 and one of the ends of the first rear fixing rod 41 are both hinged to the first tube clip 34 enabling the first tube clip 34 to be rotatable relative to the first front fixing rod 31 and the first rear fixing rod 41, and one of the ends of the second front fixing rod 32 and one of the ends of the second rear fixing rod 42 are both hinged to the second tube clip 35, enabling the second tube clip 35 to be rotatable relative to the second front fixing rod 32 and the second rear fixing rod 42, and by adjusting the position of the first front fixing rod 31 and the second front fixing rod 32 on the front sliding adjustment groove 36, and the position of the first rear fixing rod 41 and the second rear fixing rod 42 on the rear sliding adjustment groove 46, the first tube clip 34 and the second tube clip 35 can adapt to the angle and distance between the two racks of the bicycle frame 11.

The first front fixing rod 31 and the second front fixing rod 32 are fixed to the front fixing base 33 through a first screw 37, and the front fixing base 33 is provided with a front screw hole 38 communicating with the front sliding adjustment groove 36, the first screw 37 is screwed into the front screw hole 38 and is pressed against the first front fixing rod 31 and the second front fixing rod 32 causing the first front fixing rod 31 and the second front fixing rod 32 to remain fixed relative to the front fixing base 33, the first rear fixing rod and the second rear fixing rod are fixed to the rear fixing base through the first screw 37, the rear fixing base is provided with a rear screw hole communicating with the rear sliding adjustment groove, and the first screw 37 is screwed into the rear screw hole and is pressed against the first rear fixing rod and the second rear fixing rod causing the first rear fixing rod and the second rear fixing rod to remain fixed relative to the rear fixing base.

Further, one or more front fixing screw bases 4 protruding from a front end surface of the engine 22 are fixed to the front end surface of the engine, each of the front fixing screw bases 4 is provided with a front shell fixing screw hole for fixing a front shell, one or more rear fixing screw bases protruding from a rear end surface of the engine 22 is fixed to the rear end surface of the engine 22, and each of the rear fixing screw bases is provided with a rear shell fixing screw hole for fixing a rear shell.

Further, the front end face of the engine 22 is provided with four front fixing screw bases 4, and the rear end faces of the engine 22 are provided with four rear fixing screw bases.

Further, the engine 22 comprises a single cylinder two-stroke engine 22 or a single cylinder four-stroke engine 22.

While the utility model has been described in terms of what is presently considered to be the most practical and preferred embodiments, it is to be understood that the utility model needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A gasoline engine boosting system, comprising a fuel tank for storing fuel, an engine for supplying power, a fuel tube for delivering fuel to the engine, an accelerator line for controlling the fuel supply of the engine, a drive sprocket for fixing to a rear wheel, a drive chain for connecting the drive sprocket and the engine, a discharge pipe for discharging exhaust gas, and a fixing bracket for installing the gasoline engine boosting system, wherein two ends of the fuel tube are respectively connected to the fuel tank and a carburetor disposed on the engine, the accelerator line is connected with the carburetor disposed on the engine, the drive sprocket and the engine are connected by the drive chain, and the discharge pipe is connected to the engine, wherein the fixing bracket comprises an adjustable engine fixing bracket, the adjustable engine fixing bracket comprises a first front fixing rod, a second front fixing rod, a first rear fixing rod, a second rear fixing rod, a front fixing base, a rear fixing base, a first tube clip and a second tube clip, the front fixing base and the rear fixing base are respectively fixed on a front side and a rear side of the engine, wherein the front fixing base is provided with a front sliding adjustment groove allowing the first front fixing rod and the second front fixing rod to be slidable, the rear fixing base is provided with a rear sliding adjustment groove allowing the first rear fixing rod and the second rear fixing rod to be slidable, both ends of the front sliding adjustment groove or the rear sliding adjustment groove are connected to an outer space, enabling the first front fixing rod and the second front fixing rod to respectively extend from each of the ends of the front sliding adjustment groove, and enabling the first rear fixing rod and the second rear fixing rod to respectively extend from each of the ends of the rear sliding adjustment groove, one of the ends of the first front fixing rod and one of the ends of the first rear fixing rod are both hinged to the first tube clip enabling the first tube clip to be rotatable relative to the first front fixing rod and the first rear fixing rod, and one of the ends of the second front fixing rod and one of the ends of the second rear fixing rod are both hinged to the second tube clip.

2. The gasoline engine boosting system according to claim 1, wherein the first front fixing rod and the second front fixing rod are fixed to the front fixing base through a first screw, and the front fixing base is provided with a front screw hole communicating with the front sliding adjustment groove, the first screw is screwed into the front screw hole and is pressed against the first front fixing rod and the second front fixing rod causing the first front fixing rod and the second front fixing rod to remain fixed relative to the front fixing base, the first rear fixing rod and the second rear fixing rod are fixed to the rear fixing base through the first screw, the rear fixing base is provided with a rear screw hole communicating with the rear sliding adjustment groove, and the first screw is screwed into the rear screw hole and is pressed against the first rear fixing rod and the second rear fixing rod causing the first rear fixing rod and the second rear fixing rod to remain fixed relative to the rear fixing base.

3. The gasoline engine boosting system according to claim 1, wherein one or more front fixing screw bases protruding from a front end surface of the engine are fixed to the front end surface of the engine, each of the front fixing screw bases is provided with a front shell fixing screw hole for fixing a front shell, one or more rear fixing screw bases protruding from a rear end surface of the engine is fixed to the rear end surface of the engine, and each of the rear fixing screw bases is provided with a rear shell fixing screw hole for fixing a rear shell.

4. The gasoline engine boosting system according to claim 3, wherein a front end face of the engine is provided with four front fixing screw bases, and rear end faces of the engine are provided with four rear fixing screw bases.

5. The gasoline engine boosting system according to claim 1, wherein the engine comprises a single cylinder two-stroke engine or a single cylinder four-stroke engine.

6. A gasoline engine boosting bicycle, comprising a bicycle frame, a front wheel, a rear wheel and a gasoline engine boosting system, the front wheel and the rear wheel are respectively rotatably mounted at both ends of the bicycle frame, wherein the gasoline engine boosting system, comprising a fuel tank for storing fuel, an engine for supplying power, a fuel tube for delivering fuel to the engine, an accelerator line for controlling the fuel supply of the engine, a drive sprocket for fixing to the rear wheel, a drive chain for connecting the drive sprocket and the engine, a discharge pipe for discharging exhaust gas, and a fixing bracket for installing the gasoline engine boosting system, wherein two ends of the fuel tube are respectively connected to the fuel tank and a carburetor disposed on the engine, the accelerator line is connected with the carburetor disposed on the engine, the drive sprocket and the engine are connected by the drive chain, and the discharge pipe is connected to the engine, wherein the fixing bracket comprises an adjustable engine fixing bracket, the adjustable engine fixing bracket comprises a first front fixing rod, a second front fixing rod, a first rear fixing rod, a second rear fixing rod, a front fixing base, a rear fixing base, a first tube clip and a second tube clip, the front fixing base and the rear fixing base are respectively fixed on a front side and a rear side of the engine, wherein the front fixing base is provided with a front sliding adjustment groove allowing the first front fixing rod and the second front fixing rod to be slidable, the rear fixing base is provided with a rear sliding adjustment groove allowing the first rear fixing rod and the second rear fixing rod to be slidable, both ends of the front sliding adjustment groove or the rear sliding adjustment groove are connected to an outer space, enabling the first front fixing rod and the second front fixing rod to respectively extend from each of the ends of the front sliding adjustment groove, and enabling the first rear fixing rod and the second rear fixing rod to respectively extend from each of the ends of the rear sliding adjustment groove, one of the ends of the first front fixing rod and one of the ends of the first rear fixing rod are both hinged to the first tube clip enabling the first tube clip to be rotatable relative to the first front fixing rod and the first rear fixing rod, and one of the ends of the second front fixing rod and one of the ends of the second rear fixing rod are both hinged to the second tube clip.

7. The gasoline engine boosting bicycle according to claim 6, wherein the first front fixing rod and the second front fixing rod are fixed to the front fixing base through a first screw, and the front fixing base is provided with a front screw hole communicating with the front sliding adjustment groove, the first screw is screwed into the front screw hole and is pressed against the first front fixing rod and the second front fixing rod causing the first front fixing rod and the second front fixing rod to remain fixed relative to the front fixing base, the first rear fixing rod and the second rear fixing rod are fixed to the rear fixing base through the first screw, the rear fixing base is provided with a rear screw hole communicating with the rear sliding adjustment groove, and the first screw is screwed into the rear screw hole and is pressed against the first rear fixing rod and the second rear fixing rod causing the first rear fixing rod and the second rear fixing rod to remain fixed relative to the rear fixing base.

8. The gasoline engine boosting bicycle according to claim 6, wherein one or more front fixing screw bases protruding from a front end surface of the engine are fixed to the front end surface of the engine, each of the front fixing screw bases is provided with a front shell fixing screw hole for fixing a front shell, one or more rear fixing screw bases protruding from a rear end surface of the engine is fixed to the rear end surface of the engine, and each of the rear fixing screw bases is provided with a rear shell fixing screw hole for fixing a rear shell.

9. The gasoline engine boosting bicycle according to claim 8, wherein a front end face of the engine is provided with four front fixing screw bases, and rear end faces of the engine are provided with four rear fixing screw bases.

10. The gasoline engine boosting bicycle according to claim 6, wherein the engine comprises a single cylinder two-stroke engine or a single cylinder four-stroke engine.

* * * * *